United States Patent [19]

Mach

[11] Patent Number: 4,734,202
[45] Date of Patent: Mar. 29, 1988

[54] METHOD AND APPARATUS FOR CONDITIONING WATER

[76] Inventor: Guido Mach, Rudolf Waisenhorngasse 27, A-1235 Vienna, Austria

[21] Appl. No.: 845,117

[22] Filed: Mar. 27, 1986

[30] Foreign Application Priority Data

Mar. 29, 1985 [AT] Austria ................................. 945/85

[51] Int. Cl.$^4$ .............................. C02F 1/48; C02F 1/50
[52] U.S. Cl. ..................................... 210/695; 210/95; 210/136; 210/206; 210/222; 210/257.1; 210/764; 422/29
[58] Field of Search ............... 422/22, 28, 29; 210/94, 210/95, 206, 222, 223, 257.1, 695, 764, 136

[56] References Cited

U.S. PATENT DOCUMENTS

| | | | |
|---|---|---|---|
| 4,053,410 | 10/1977 | Lorimor | 210/223 X |
| 4,065,386 | 12/1977 | Rigby | 210/695 |
| 4,153,559 | 5/1979 | Sanderson | 210/222 |
| 4,371,437 | 2/1983 | Iwasaki et al. | 210/94 |
| 4,416,854 | 11/1983 | Nielsen | 422/29 |
| 4,428,837 | 1/1984 | Kronenberg | 210/222 |

FOREIGN PATENT DOCUMENTS 124415  4/1931  Austria .
400924  4/1966  Switzerland .

*Primary Examiner*—Richard V. Fisher
*Assistant Examiner*—W. Gary Jones
*Attorney, Agent, or Firm*—Spencer & Frank

[57] ABSTRACT

A method for conditioning water includes the steps of subjecting the water to a magnetic field treatment by causing it to flow through at least one magnetic field; and subjecting the water, in combination with the magnetic field treatment, to an oligodynamic treatment. An apparatus for conditioning water includes a chamber defining a flow path through which the water to be conditioned flows; at least one magnet system disposed about the chamber for generating a magnetic field, which magnetic field extends transversely to and penetrates the flow path; and pieces of at least one oligodynamically active metal disposed in the flowing water within the chamber.

15 Claims, 2 Drawing Figures

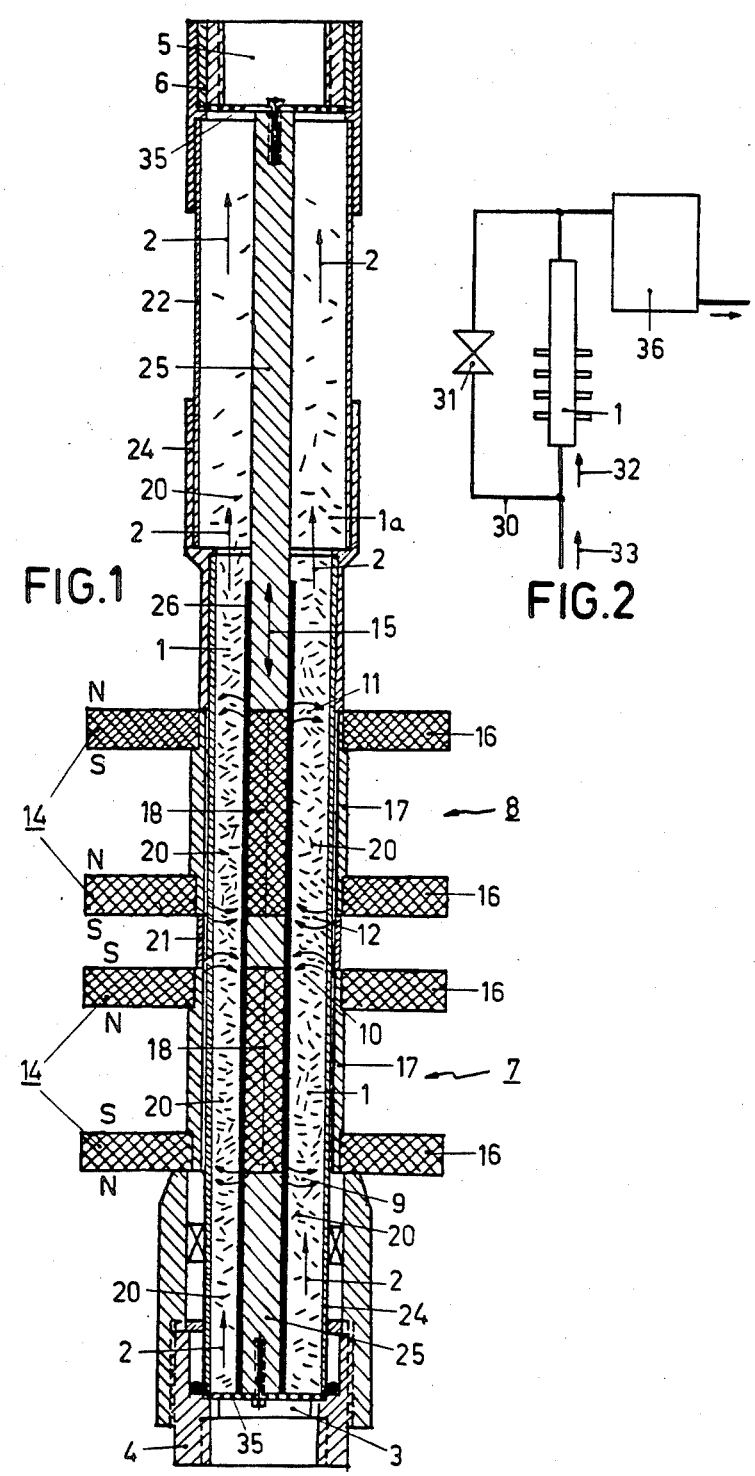

METHOD AND APPARATUS FOR CONDITIONING WATER

BACKGROUND OF THE INVENTION

1. Field of the Invention

The invention relates to a method for conditioning drinking and/or utility water in which the water is conducted through one or a plurality of magnetic field(s).

2. Background of the Art

Various techniques are known for processing drinking and/or utility water and these techniques are used when adverse effects of substances present in the drinking and/or utility water are to be reduced or eliminated. By treating the water with magnetic fields, in which case the water is conducted through one or a plurality of magnetic fields, the development of undesirable deposits of mineral salts contained in the water in pipes and vessels can be counteracted. However, magnetic field treatment generally has little or no effect against the adverse effects of living microorganisms, such as, for example, bacteria and/or algae which are present in the water. To counteract the disadvantageous effects of the presence of such microorganisms in the water, chemical agents are generally added to the water, such as, for example, halogens or halogen compounds, but such additives themselves usually produce undesirable side effects. It is also known to subject water, in order to prevent or eliminate adverse effects from microorganisms, to a treatment with oligodynamically acting metals, i.e., metals which are active in small amounts to sterilize or purify water. Such treatment, however, is effective only against microorganisms present in the water and has no direct influence on undesirable deposits formed by the mineral salts contained in the water.

It is an object of the present invention to provide a method for counteracting the undesirable effects of development of annoying deposits of mineral salts and microorganisms contained in water. It is another object of the invention to provide an apparatus suitable for implementing the above method.

SUMMARY OF THE INVENTION

The method according to the invention of the above-mentioned type is characterized in that water to be conditioned is subjected, in combination with a magnetic field treatment, also to an oligodynamic treatment. With this procedure, the above-mentioned object can be realized very well.

The two components of the water treatment provided in combination support one another in an unexpectedly advantageous manner. The magnetic field treatment of the water was found to further enhance the oligodynamic effect of the metal ions so that even smaller quantities of such metal ions in the water were found to be very efficacious against microorganisms. At the same time, the oligodynamic effect which prevents or reduces the development of deposits of organic material also counteracts the inevitable tendency for deposits of organic material to enhance the development of mineral deposits. The combination of a magnetic field treatment with an oligodynamic treatment, as provided in the method according to the invention, permits the introduction of minimally small amounts of metal into the water and is of special significance since the water need not be loaded with large amounts of metal ions, which is of particular advantage for the processing of drinking water.

The possibility provided with the method according to the present invention of using a relatively small amount of the ions of oligodynamically active metals in the water is utilized in a very simple implementation of the method according to the invention which is characterized in that the oligodynamic treatment is effected without any external supply of current by placing pieces of oligodynamically active metals into the flowing water. This enhances introduction of oligodynamically active ions into the water to be treated so that unexpectedly larger quantities of water can be treated in a relatively short period of time if the oligodynamically active metal pieces are arranged to be movable in the range of the magnetic field or fields. In this way, variable electrical eddy currents are created in the metal pieces and these currents enhance the release of metal ions. A further enhancement results if at least two different oligodynamically active metals are used, since in this way the release of ions is made more intensive by an electrolytic effect. Moreover, the introduction of the ions of several oligodynamically active metals into the water provides an improved attack on microorganisms living in the water. The desired release of metal ions from the oligodynamically active metal can be further enhanced by using small metal pieces whose dimensions and shapes are such that the flowing water will move them if they are placed loosely into the flowing water. The good result of this technique appears to be explained by the fact that the intensive movement imparted to the small metal pieces by the flowing water generates correspondingly distinct eddy currents in the small metal pieces. It is favorable in this connection if small metal plates are used which have a diameter of about 5–10 mm. In this connection, it is a further advantage for the efficacy of the magnetic treatment, as well as for producing intensive movement of the metal pieces, if the water to be processed is caused to flow upwardly in an approximately vertical direction through one or a plurality of magnetic fields which are disposed in the region of this vertically extending flow section and the flow rate of the water is set to be such that the oligodynamically active metal pieces introduced into the range of the magnetic field move constantly in the region of the magnetic field. For this purpose, it is of advantage to adjust the flow rate in such a manner that the metal pieces are kept approximately in suspension with a back and forth movement within the zones influenced by the magnetic field.

Regarding the oligodynamic treatment, it is favorable to use silver bodies alone or silver bodies together with bodies of another oligodynamically active metal to supply the metal ions, with the other metal preferably being copper. The preferred combination of silver and copper, if a plurality of metals are used, is favorable with respect to the introduction of the metal ions into the water, which is supported by electrolytic effects, as well as with respect to the intended effect on the microorganisms living in the water. Advantageously, bodies of a weakly alloyed silver are used as the silver bodies, preferably bodies of silver which have a pure silver rating of about 900.

In order to fully utilize the realizable effect in the treatment according to the invention, it is of advantage for the magnetically and oligodynamically treated water to be stored, after the conditioning treatment, for at least 15 minutes, preferably for 20 to 30 minutes, then to be filtered and then made available for its intended use.

The apparatus according to the invention is characterized in that it includes a chamber forming a flow path in whose region at least one magnet system is disposed which produces a magnetic field that extends transversely to and penetrates the flow path, and that, further, bodies made of one or a plurality of oligodynamically active metal(s) are disposed in the chamber. This apparatus has the advantage of very simple construction and the further significant advantage that it is operationally reliable even over long periods of time and requires hardly any maintenance. It is further favorable to loosely arrange bodies, i.e., pieces, composed of oligodynamically active metal(s) in the chamber and to provide perforated metal sheets, screens or similar foraminous members on the inlet and outlet sides of the chamber so as to permit passage of the water, but prevent passage of the above-mentioned bodies. In this way, the loose arrangement of the metal bodies in the chamber permits easy realization of good mobility of the bodies, which enhances, as mentioned above, the easy release of the metal ions and, at the same time, the metal bodies are prevented from undesirably escaping from the chamber, with the latter being fully effective even under great fluctuations in the flow rate through the chamber.

The movement of the metal bodies releasing the oligodynamically active ions in the chamber through which flows the water to be treated is to be effected in such a manner that these bodies remain essentially in the region of the magnetic fields which traverse the flow path of the water through the chamber. This is advantageously realized by a selection or adjustment of the quantity of water flowing through the chamber, i.e. of the flow rate of the water in the chamber. For this adjustment and to monitor the movement of the metal bodies in the chamber, it is of advantage to configure part of the chamber wall as an observation window. In this connection it is favorable to dispose one or a plurality of observation windows in the region of the magnetic fields penetrating the chamber. It is further of advantage to dispose one observation window in the portion of the chamber wall adjacent the outlet opening because then it will be possible to quickly detect whether the flow rate is so high that the metal bodies are driven out of the range of the magnetic fields and if such an undesirable state is detected, to be able to quickly remedy the situation.

Preferably the flow path through the chamber goes from the bottom to the top and the flow cross-section of the chamber, in the section disposed between the magnetic fields and the outlet opening of the chamber, is greater than in the region of the chamber therebelow. Thus, the flow of water to be treated through the chamber imparts an upward lift to the bodies of oligodynamic metal moving them upwardly through the chamber, which movement is counteracted by gravity and also by forces produced in the magnetic fields. If the quantity of water to be treated and flowing through the chamber is suitably selected, few of the bodies will enter into the section disposed upstream of the outlet opening of the chamber, because the flow rate there is lower due to an enlarged flow cross-section and the bodies will return from there into the region of the chamber in which the magnetic fields are located. It is thus possible for the flow rate to fluctuate within a certain range without adversely affecting the desired state in which the bodies of oligodynamic metal remain almost suspended in the region of the magnetic fields.

With respect to the magnet systems provided in the apparatus according to the invention, it is favorable to arrange a plurality of magnet systems in succession along the flow path through the chamber and to orient their magnetic flux in such a manne that successive magnetic fields penetrating the flow path are oriented in different, mutually opposite directions. Thus, when the water flows through the device, it is subjected to a plurality of magnetic fields in succession, i.e., in series, each with a different orientation. This is particularly favorable for the magnetic treatment to counteract the creation of compact deposits of mineral salts.

An embodiment which is of advantage with respect to its magnetic effect on the water and with respect to the structural configuration of the apparatus according to the invention is characterized in that the chamber has a pipe-like configuration and at least one magnetic system is provided which includes a permanent magnet that is disposed outside the chamber and is magnetized in the longitudinal, i.e. axial, direction of the chamber, and a core of magnetizable material that is disposed in the interior of the chamber, with the magnetic flux flowing approximately parallel to the direction of flow of the water through the chamber. The magnetic flux of the permanent magnets disposed outside the chamber traverses the flow of water in the chamber from one side to produce a first magnetic field and then flows back from the core toward the other side of the permanent magnets disposed outside the chamber, thus again traversing the flow of water in the chamber, to produce a second magnetic field oriented oppositely to the first-mentioned magnetic field. For the purpose of further intensifying the magnetic effect on the water, it is favorable for the core disposed in the chamber and belonging to the respective magnet system to be an axially magnetized permanent magnet.

To realize the most uniform magnetic fields possible in the chamber in which the water is treated, it is further favorable if the permanent magnet disposed outside the chamber in the respective magnet system is a ring magnet which surrounds the chamber. For the stability of the magnet system or systems it is of further advantage if the permanent magnets are made of a material having a high coercivity. For example, ferrite magnets have a relatively high coercivity and, moreover, are inexpensively available.

One embodiment of the apparatus according to the invention, which especially takes into account the characteristics of such magnets and which permits the realization of particularly effective magnetic fields even with a structurally simple design, is characterized in that the permanent magnet disposed outside the chamber is formed of two coaxially arranged rings which surround the chamber and which are axially magnetized and are connected with one another by means of a pipe of magnetizable material which is coaxial with the rings.

One embodiment of the apparatus according to the invention which is of particular advantage with respect to the magnetic influence on the water to be treated is characterized in that two magnet systems are disposed one behind the other when seen in the direction of the axis of the chamber, with their identical poles facing one another.

One embodiment of the apparatus according to the invention which permits the setting of a certain flow rate in a simple manner-which is significant, as mentioned above, for the efficacy of the water treatment-is characterized in that a bypass conduit is provided which is connected in parallel with the chamber with respect to flow, and includes a check valve.

BRIEF DESCRIPTION OF THE DRAWING

The invention will now be explained further with reference to the drawings in which embodiments of the apparatus according to the invention are illustrated schematically. FIG. 1 of the drawing shows an embodiment of an apparatus according to the invention in longitudinal section and FIG. 2, in a schematic illustration, one embodiment of such an apparatus in which the flow can be regulated.

DESCRIPTION OF THE PREFERRED EMBODIMENTS

The embodiment of an apparatus for conditioning drinking and/or utility water shown in FIG. 1 includes a chamber 1 whose interior forms a flow path 2 within which the water is treated. Water enters chamber 1 at connection member 4 which forms an inlet opening 3 and leaves the chamber at connection member 6 which forms an outlet opening 5. Two magnet systems 7, 8 are disposed at chamber 1 and each produces two magnetic fields 9, 10 and 11, 12 extending transversely to the flow path and penetrating it.

In the embodiment illustrated in FIG. 1, chamber 1 has the shape of a pipe and the magnet systems 7, 8 include a permanent magnet 14 disposed outside chamber 1 and magnetized in the longitudinal, i.e. axial, direction of chamber 1 as indicated by double arrow 15. In the illustrated case, permanent magnets 14 are each formed of two axially magnetized magnet rings 16 which are arranged coaxially to one another and are connected with one another by means of a pipe 17 of magnetizable material which is coaxial with the rings. This configuration of permanent magnets 14 requires use of permanent magnet materials having a high coercivity, as available, for example, from ferrite magnets. Additionally, this embodiment has the advantage of structural simplicity. However, other configurations are also possible for the permanent magnet disposed outside the pipe-like chamber 1 and magnetized in the longitudinal, i.e. axial, direction of this chamber, such as, for example, individual, axially magnetized magnet rings which have a larger axial dimension than the magnet rings shown in the drawing and are composed, for example, of a magnet alloy of AlNiCo or individual magnet blocks arranged around chamber 1 and optionally provided with corresponding pole pieces which direct the magnetic flow into chamber 1.

Magnet systems 7, 8 further include a core 18 of magnetizable material disposed in the interior of chamber 1, with the magnetic flux flowing through the core essentially parallel to the direction of flow of the water through chamber 1. Thus, the magnetic flux from permanent magnet 14 disposed outside chamber 1 of the respective magnet system passes from one side of the externally disposed permanent magnet through the flowing water in the chamber and forms a magnetic field to reach core 18 and then leaves this core 18 while forming a further magnetic field oriented oppositely to the first-mentioned magnetic field, again traversing the flowing water in the chamber and then reaches the other side of permanent magnet 14 disposed outside the chamber. Core 18 may be made of a conventional ferromagnetic material, such as, for example, soft iron. Advantageously, however, an axially magnetized permanent magnet will be provided as core 18 since in this way it is possible to augment the magnetic flux and the magnetic field intensity, respectively, in magnet fields 9, 10 and 11, 12, respectively. With this configuration of core 18 as an axially magnetized permanent magnet it is of advantage if the axially magnetized permanent magnet disposed outside the chamber is provided, as shown, with a pipe 17 of magnetizable material, particularly soft iron, with such pipe extending along the outer wall of chamber 1 and the permanent magnet body, e.g., in the form of rings, is placed onto this pipe.

The orientation in different, mutually opposite directions of successive magnetic fields 9, 10 and 11, 12 obtained by the structure of magnet systems 7,8 arranged one behind the other along the flow path leading through chamber 1 (as indicated by arrows in the drawing) is significant for good efficacy of the magnetic field water treatment and also is favorable for the specific type of oligodynamic treatment to be discussed in greater detail below.

Magnet systems 7, 8 are arranged in such a manner that identical poles face one another, south poles in the illustrated case. This permits the realization of a very high field intensity for the magnetic fields traversing the flow path of the water at mutually facing sides of the magnet systems, particularly if magnet systems 7, 8 are arranged in very close proximity to one another.

For the oligodynamic treatment of the water, bodies or pieces 20 of one or a plurality of oligodynamically active metal(s) are disposed in chamber 1. It is favorable if bodies of silver and bodies of copper are provided for this purpose. Advantageously, bodies are used which have the shape of small metal plates having a diameter of about 5-10 mm, e.g., about 7 mm diameter. These bodies or pieces 20 composed of oligodynamically active metals must be disposed, when the apparatus is in operation, within the range of magnetic fields 9, 10 and 11, 12. For this purpose, these bodies may be attached to strings, wires or the like so as to make them easily mobile. It is more advantageous for these bodies to be kept in suspension, with chamber 1 in a vertical position, by appropriately setting the water flow rate through the chamber in the region of the magnetic fields. This results in a relatively strong inherent movement of these bodies and causes the magnetic fields to induce eddy currents in these bodies and also alternating intermittent contact between the bodies which move up and down in the flow under the influence of the flow, on the one hand, and under the influence of gravity, on the other hand, with oligodynamically active metal ions moving away from these bodies into the water subjected to the treatment. Keeping the small bodies of oligodynamically active metal suspended within the range of the magnetic fields is enhanced also by the eddy currents generated in these bodies by the electromotive force induced in the bodies due to their movement in the magnetic field, with the eddy currents themselves attenuating the movement of the bodies.

The loose arrangement of the metal pieces 20 of oligodynamically active metals in chamber 1 also has the advantage that such pieces, if needed, can be replenished in a very simple manner.

To be able to easily monitor the movement of metal pieces 20 in chamber 1, which takes place under the influences of gravity and the magnetic fields and, in conjunction with this, to be able to adjust the flow rate in such a way that metal pieces 20 remain suspended in the range of the magnetic fields or move within the range of the magnetic fields, part of the wall of chamber 1 is designed as an observation window. In the embodiment illustrated in FIG. 1, such an observation window 21 is disposed in the region of the magnetic fields penetrating the chamber between the two magnet systems 7, 8 and a further observation window 22 is disposed in the portion of the chamber wall adjacent outlet opening 5. Thus, it can easily be determined, on the one hand, whether metal pieces 20 are present in the region of the magnetic fields and, furthermore, whether the flow is so strong that a large number of metal pieces 20 has been driven into the region of outlet opening 5. If this is the case, the flow rate of the water flowing through chamber 1 can be reduced accordingly. If, on the other hand, no pieces 20 of oligodynamically active metal are present in the region of outlet opening 5, this indicates that a large number of them have been deposited in the region of the inlet opening and the flow rate of the water through the chamber can be increased accordingly. If metal pieces 20 in the form of small plates having a diameter of about 7 mm are provided for the oligodynamic treatment of the water, these can be kept in a suspension-like motion distributed throughout the chamber by adjusting the flow rate to a value, for example, of between about 20 and 80 cm/s. For example, in a chamber 1 having the configuration shown in FIG. 1, and having a chamber volume of about 1.81, between the outer wall 24 and chamber 1 and the center holding rod 25 or holding rod 26 made of nonmagnetic material, e.g., plastic, for cores 18 of the magnet systems, metal pieces 20, composed of small silver and copper plates having a diameter of about 7 mm, were filled into chamber 1 in a quantity of about 200 g.

In its upper section 1a disposed upstream of outlet opening 5 and upstream of connecting member 6, chamber 1 has a larger flow cross-section than in the region disposed therebelow so that a decrease in flow rate results within upper section 1a which reduces the upward lift imparted to the metal pieces 20 of oligodynamic metal by the flow. This counteracts the upward movement of metal pieces 20 toward outlet opening 5 and enhances retention of metal pieces 20 in the region of magnetic fields 9–12, even if the flow rate required to keep metal pieces 20 in suspension has been noticeably exceeded. Thus, the requirement for precision in the adjustment of the flow rate is reduced significantly.

As shown in FIG. 2, a bypass conduit 30 connected in parallel with chamber 1 with respect to the flow may be provided for adjusting the flow rate. Bypass conduit 30 includes a check valve 31 which can be actuated manually or automatically. Thus, a change in the portion 32 of the total flow 33 flowing through chamber 1, very simply causes the flow rate through the chamber to be adjusted very easily to the respectively desired or required value.

To securely retain metal pieces 20 in chamber 1, regardless of fluctuations in the flow rate of the water, perforated metal sheets 35, which may be made, for example, of stainless steel, are provided at inlet opening 3 and at outlet opening 5. Instead of such perforated sheets, any foraminous member, such as wire screens or correspondingly closely arranged bars, may be provided, through which the water is able to pass.

The water treated by the method according to the invention are advisably freed by filtering after treatment of the then-dead microorganisms. In the interest of the best possible efficacy of this separation, intermediate storage for at least about 15 minutes, preferably 20 to 30 minutes, after the treatment in a vessel 36, as indicated in FIG. 2, is preferably provided. After this intermediate storage, the water is filtered and then the treated water is available for use.

It will be understood that the above description of the present invention is susceptible to various modifications, changes, and adaptations, and the same are intended to be comprehended within the meaning and range of equivalents of the appended claims.

What is claimed is:

1. A method for conditioning water, comprising:
    subjecting the water to a magnetic field treatment by causing it to flow through at least one magnetic field; and
    subjecting the water, in combination with the magnetic field treatment, to an oligodynamic treatment performed without external current supply by disconnectedly disposing metal pieces of at least one oligodynamically active metal in the flowing water, the metal pieces having dimensions and shapes which allow them to be moved by the flowing water, wherein the at least one magnetic field surrounds a vertical flow section and the metal pieces are movably disposed within the vertical flow section, and wherein the water is caused to flow upwardly through the vertical flow section and has a flow rate which is adjusted so that the oligodynamically active metal pieces constantly move.

2. The method according to claim 1, wherein the flow rate is adjusted so that the metal pieces remain approximately in suspension while moving back and forth.

3. An apparatus for conditioning water by subjecting same to a magnetic field treatment in combination with an oligodynamic tractment, the apparatus comprising:
    means defining a chamber in which chamber is defined a flow path through which the water to be conditioned flows, the chamber having means defining an inlet opening and means defining an outlet opening;
    at least one magnet system disposed about said chamber for generating a magnetic field, which magnetic field extends transversely to and penetrates the flow path; and
    pieces of at least one oligodynamically active metal disconnectedly disposed within the magnetic field in the the flow path of the water within the chamber, wherein foraminous members are positioned respectively at said inlet opening and said outlet opening of the chamber for permitting the passage of the water therethrough while preventing the passage of said metal pieces from said chamber.

4. An apparatus for conditioning water by subjecting same to a magnetic field treatment in combination with an oligodynamic treatment, the apparatus comprising:
    means defining a chamber in which chamber is defined a flow path through which the water to be conditioned flows,
    at least one magnet system disposed about said chamber for generating a magnetic field, which magnetic field extends transversely to and penetrates the flow path; and
    pieces of at least one oligodynamically active metal disposed within the magnetic field in the flow path of the water within the chamber.

5. The apparatus according to claim 4, wherein the oligodynamically active metal pieces are movably disposed within the magnetic field.

6. The apparatus according to claim 4, wherein said chamber includes a chamber wall provided with at least one observation window.

7. The apparatus according to claim 6, wherein at least one observation window is provided for observing each portion of the flow path which is penetrated by a magnetic field.

8. The apparatus according to claim 6, wherein an observation window is disposed in said chamber wall adjacent to said outlet opening.

9. The apparatus according to claim 4, wherein a plurality of magnet systems are provided and are serially arranged along said flow path, successive magnetic fields being oriented in opposite directions with respect to one another.

10. The apparatus according to claim 4, wherein said chamber has the shape of a pipe and has an axial direction, which axial direction is parallel to said flow path, and wherein each said at least one magnet system includes a core, a first permanent magnet and a second permanent magnet, said core being comprised of magnetizable material, being disposed in the interior of the chamber, and providing a magnetic flux which extends in a direction which is approximately parallel to said axial direction, said first permanent magnet and said second permanent magnet being disposed outside said chamber, being magnetized in said axial direction, and providing magnetic fluxes which traverse said chamber, said magnetic flux emanating from said first permanent magnet, traversing said chamber, forming a first magnetic field and flowing to and through said core, and flowing from said core, traversing said chamber, forming a second magnetic field, and flowing to said second permanent magnet, said first magnetic field having an orientation which is opposite to that of said second magnetic field.

11. The apparatus according to claim 10, wherein said core is an axially magnetized permanent magnet.

12. The apparatus according to claim 10, wherein each said at least one magnet system includes a pipe comprised of magnetizable material, and wherein said first permanent magnet and said second permanent magnet have the form of coaxial rings which surround the chamber and are axially magnetized, and are interconnected by said pipe, which pipe extends coaxially with respect to said rings.

13. The apparatus according to claim 10, wherein two magnet systems are provided and are serially arranged along said flow path, each magnet system having a north pole and a south pole, said two magnet systems being arranged so that either the respective north poles face one another or the respective south poles face one anther.

14. The apparatus according to claim 10, further comprising a bypass conduit which includes a check valve and which defines a flow path, which flow path parallels said flow path within said chamber.

15. The apparatus according to claim 4, wherein said chamber extends vertically and has an outlet opening positioned at the upper end thereof, the flow cross-sectional area of the chamber between the magnetic field and the outlet opening being greater than the flow cross-sectional area of the chamber within the magnetic field.

* * * * *